June 1, 1943.  A. M. FEDDE  2,320,354
GYROSCOPE SYSTEM
Filed July 29, 1941  2 Sheets-Sheet 1

INVENTOR
Arnold M. Fedde
BY
ATTORNEY

June 1, 1943.　　　A. M. FEDDE　　　2,320,354
GYROSCOPE SYSTEM
Filed July 29, 1941　　　2 Sheets-Sheet 2

INVENTOR
Arnold M. Fedde
BY
ATTORNEY

Patented June 1, 1943

2,320,354

UNITED STATES PATENT OFFICE 2,320,354

GYROSCOPE SYSTEM

Arnold M. Fedde, Brooklyn, N. Y.

Application July 29, 1941, Serial No. 404,455

5 Claims. (Cl. 33—204)

This invention relates to gyroscope systems, and, more particularly, to what may be characterized as a horizon gyro system especially suitable for use in airplanes for the purpose of indicating the inclination with respect to the horizontal of one or both of the major axes of the airplane.

An object of my invention is to provide a horizon gyro control system of such a nature that the usual gyro precession errors are practically neutralized or eliminated, and this may be accomplished without employing means for curbing or restricting the precession movements of the gyro elements in response to extraneous forces which tend to cause the gyro axes to depart from their normal vertical positions. With this object in view my invention contemplates the use of two gyroscopes of the ordinary horizon type but of unequal sensitivity and so arranged that the effect produced by the precession of either gyro away from its normal vertical position may be said to be neutralized by a corresponding or proportional movement of the other gyroscope, the two gyroscopes cooperating at all times to indicate the inclination with respect to the horizontal of either or both of the major axes of the airplane.

A further object of this invention is to provide a system employing two horizontal gyros of ordinary construction but of unequal sensitivity so arranged that a substantially true artificial horizon is provided for indicating or control purposes.

The ordinary horizon gyro indicating or control system employs a so-called horizon gyro stabilized with the gyro axis in a vertical position. The gyro element is stabilized by means of air jets controlled by pendulous vanes, or by other well known means, which cause the gyro rotor axis to seek the resultant of the acceleration forces acting on the gyroscope. Normally the force of gravity is the predominant force and the gyro axis remains vertical. However, when extraneous forces act on the gyroscope, such as lateral acceleration forces occurring during violent air turbulence or during turns of the airplane in which the system is employed, the gyroscope is caused to precess away from its normal vertical position, and under such circumstances the error introduced may be so substantial that the horizon indicators or controls are not reliable. This has led to the use of various devices for curbing the precession movements of the gyro away from the vertical but in general these corrective devices have not proved entirely satisfactory. According to my invention two gyroscopes are combined in a system such that precession errors are practically neutralized without employing any means for limiting or curbing the precession of the gyroscopes.

In general, the objects of my invention may be attained by employing two horizon gyroscopes of ordinary construction, with one of the gyroscopes preferably twice as sensitive as the other gyroscope in its response to extraneous forces tending to cause precession of the gyro axes. These two gyroscopes are combined with mechanism for indicating a substantially true artificial horizon at all times. This mechanism may be employed for automatic control purposes, and it may also provide a reliable indication of the inclination with respect to the horizontal of one or both of the major axes of the airplane. Thus the pitch of the airplane may be indicated, or the bank inclination, or both of these attitudes may be indicated simultaneously by any suitable indicating mechanism.

The various objects and advantages of my invention will be more apparent upon considering the following detailed description of an illustrative embodiment thereof shown in the accompanying drawings in which.

Figure 1:
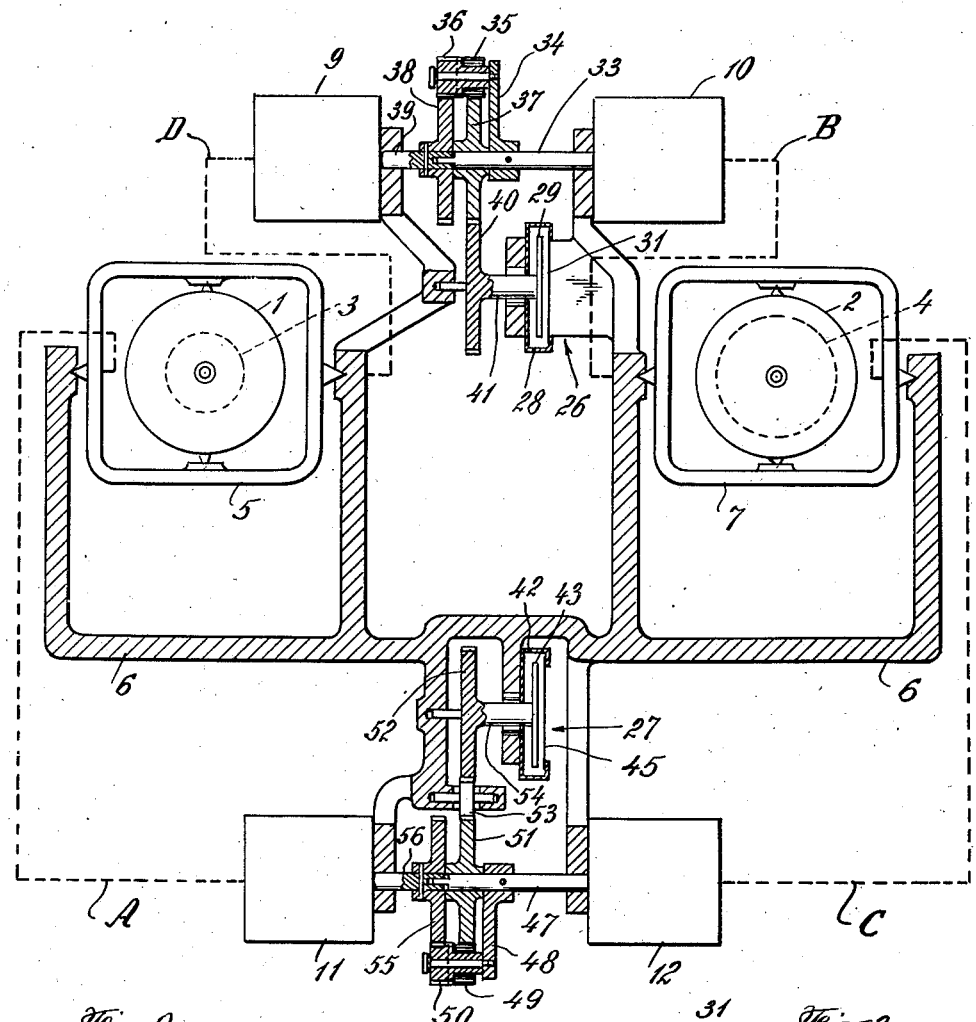
Fig. 1 is a horizontal section view, largely diagrammatic, of a horizon gyro system embodying the invention.

Referring to Fig. 1, the system there illustrated includes two gyroscopes the casings of which are shown at 1 and 2, the rotor of gyroscope 1 being shown at 3 and the rotor of gyroscope 2 being shown at 4. The gyroscope 1, which may be termed a pilot gyro, is mounted in the usual gimbal ring 5 carried by a support 6 and in like manner the gyroscope 2, which may be termed the master gyro, is mounted in a gimbal ring 7 carried by the support 6. Each gyroscope in this particular embodiment of the invention thus has two degrees of freedom, for the gyro casing may rotate with respect to the gimbal ring in which it is mounted and the gimbal ring may rotate with respect to the support or casing 6. The gyroscope 1, shown diagrammatically in Fig. 1, is illustrated in some greater detail in Fig. 4. In general, both gyroscopes may be of the same construction except for means whereby one gyro is rendered more sensitive than the other gyro in its response to extraneous forces applied to the system. Except for this feature, both gyros may be of the same construction and they are of the well known gyro vertical type having means associated therewith for causing the gyro rotor axes to normally occupy vertical positions. Thus in one well known type of vertical gyro, four pendulous vanes (one of which is shown at 8 in Fig. 4) are associated with each gyro casing and these vanes control air jets issuing from vents in the casing, the arrangement being such that under normal conditions the force of gravity acting on the vanes causes them to control the air jets in such a manner that an erecting torque is applied to the gyro so that it seeks the vertical position. It will be understood that if the gyroscopes are so constructed that the erecting torque of the pilot gyro 1 is greater than that of the master gyro 2 the rate of precession or sensitivity of the pilot gyro will be greater than that of the master gyro. This difference in sensitivity may be attained in other ways, as by having the rotational mass of the pilot gyro rotor smaller than that of the master gyro and for the purpose of illustrating this I have shown the rotor 3 of the pilot gyro 1 as being of smaller dimensions than the rotor 4 of the master gyro 2. The difference in sensitivity may be attained by causing the pilot gyro rotor to rotate at a less rapid rate than the rotor of the master gyro and it is to be understood that any combination of these methods may be employed for obtaining the desired difference in sensitivity. In general, for the particular embodiment illustrated in the accompanying drawings I prefer to have the pilot gyro substantially twice as sensitive as the master gyro so that any extraneous force on the system will cause an angular displacement or precession of the pilot gyro that is twice the magnitude of the displacement of the master gyro. As stated above, the sensitivity is the rate of precession and regardless of the method employed for obtaining the desired difference in sensitivity it will be understood that, according to my invention, the rate of precession of the pilot gyro will be greater than that of the master gyro.

Any well known mechanisms for transmitting the angular displacements of the gyros and their gimbal rings may be employed for the purpose of imparting this movement or displacement to suitable follow-up mechanisms illustrated diagrammatically at 9, 10, 11 and 12 in Fig. 1, the transmission mechanisms being indicated diagrammatically in Fig. 1 by the dotted lines A, B, C and D. For the purpose of illustrating a typical transmission mechanism for transmitting the motion of the gyro casing with respect to the gimbal ring I have shown a mechanical arrangement in Fig. 4 which includes a bevel gear segment 13 fixed to the gyro casing 1 and a gear 14 fixed to the gimbal ring 5. These gears operate gear trains hereinafter described so that the output shaft 15 will impart to a follow-up mechanism, for example that shown at 9 in Fig. 1, a displacement proportional to the rotation of the gyro axis with respect to the gimbal ring 5, the arrangement being such that rotation of the gimbal ring with respect to the casing 6 is not transmitted to this follow-up mechanism. It will be understood that the transmission mechanism shown in Fig. 4 is illustrated diagrammatically in Fig. 1 by the dotted line D and it will also be understood that similar transmission mechanism is employed at B in Fig. 1.

Figure 4:
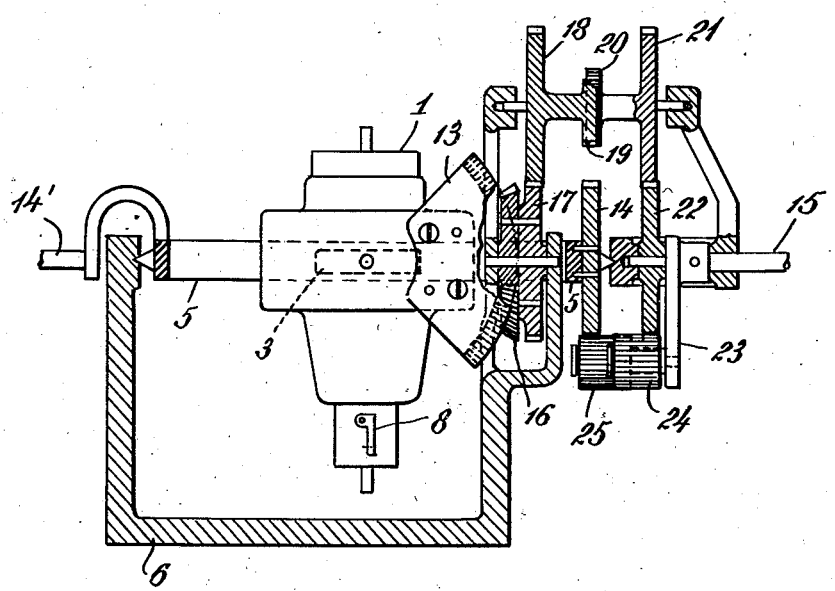
Fig. 4 is a vertical section view of an ordinary horizon gyro combined with mechanism whereby displacement of the gyro with respect to its gimbal mounting, and displacement of the gimbal ring with respect to the supporting frame, may be transmitted to a typical follow-up system.

Referring again to the transmission mechanism illustrated in some detail in Fig. 4 the gear segment 13 carried by the gyro casing meshes with a bevel gear 16 arranged with its axis in alignment with the axis of rotation of the gimbal ring 5. The bevel gear 16 is fixed to a gear 17 meshing with a gear 18 and through intermediate gears 19, 20 and 21 the rotation of the gyro casing about its axis is transmitted to a gear 22 meshing with the gear 21. Gear 22 is rotatably mounted on a shaft in alignment with the output shaft 15 which carries an arm 23 supporting two intermeshing spur gears 24 and 25. Gear 25 meshes with the gear 14 fixed with respect to the gimbal ring. The arm 23 is fixed with respect to the output shaft 15. The gear ratio between the segment 13 and the bevel gear 16 is 2 to 1 and in general the arrangement is such that rotation of the gimbal ring 5 with respect to the support 6 does not produce any rotation of the arm 23 or the output shaft 15. This condition obtains because while rotation of the gimbal ring causes a corresponding rotation of the gear 14 fixed thereto which tends to cause the arm 23 to swing in one direction, the rotation of the gimbal ring also causes the gear 17 to rotate and the gear train associated with gear 17 tends to cause the arm 23 to swing in the opposite direction, the net result being no displacement of the arm 23 or of the output shaft 15. On the other hand, whenever the gyro casing rotates with respect to the gimbal frame 5 the gear segment 13 causes rotation of the gear 17 but the gear 14 does not rotate and the net result is a rotation or displacement of the arm 23 and the output shaft 15. Thus the transmission mechanism D of Fig. 1 will transmit a motion to the follow-up mechanism 9 proportional to the angular displacement of the gyro casing 1 with respect to the gimbal frame, and in like manner a similar mechanism B will transmit to the follow-up mechanism 10 the angular motion or displacement of the master gyro casing 2 with respect to its gimbal frame 7. Transmission mechanisms, (such as shaft 14', see Fig. 4) are employed at A and C for transmitting to the follow-up mechanisms 11 and 12 respectively the angular displacement or rotation of the gimbal rings 5 and 7 with respect to the casing or support 6. It is to be understood that any well known transmission mechanism may be employed for transmitting these angular displacements or movements to the follow-up mechanisms.

The axes of rotation of the gimbal rings 5 and 7 are in alignment or parallel to each other and the system may be mounted on an airplane with these axes parallel to or in alignment with the longitudinal axis of the airplane. In such an installation the system may be provided with horizon indicators for indicating the pitch or bank, or both the pitch and the bank of the airplane. The pitch is of course the inclination of the longitudinal axis of the support 6 and of the airplane with respect to the horizontal, and the bank is the inclination of the transverse axis of the support 6 and of the airplane with respect to the horizontal. In accordance with well known practice a single instrument may be employed for indicating both the pitch and the bank but for convenience of illustration I have shown separate pitch and bank indicators in the accompanying drawings. The pitch indicator is shown at 26 in Fig. 1 and in Fig. 3 and the bank indicator is shown at 27 in Fig. 1 and also in Fig. 2. The pitch indicator comprises a case 28 carried by the support 6 and having a scale or graduations thereon and inside the case a disk or support 29 is rotatably mounted, the support 29 bearing an artificial horizon line 30. A transparent cover 31 at the front of the case 28 has a reference mark thereon representing the longitudinal axis of the support 6 and of the airplane. This mark may be in the form of an outline of a miniature airplane as shown at 32, this mark representing a side view of the airplane with its longitudinal axis normally in alignment with the horizon line 30 when the pitch of the airplane is zero. The dotted line 30' in Fig. 3 indicates the relative position of the reference mark 32 with respect to the artificial horizon showing the pitch of the airplane during a climb to a higher altitude. As hereinafter explained the artificial horizon line remains horizontal and the inclination of this line with respect to the reference mark 32 at any time indicates the pitch of the airplane.

Figure 5:
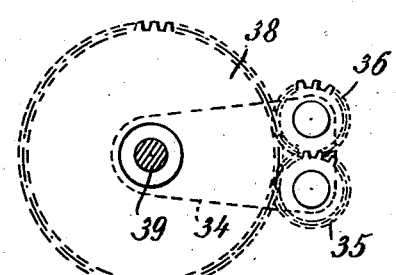
Fig. 5 is an enlarged detail view of some of the mechanism illustrated in Fig. 1
Figure 6:
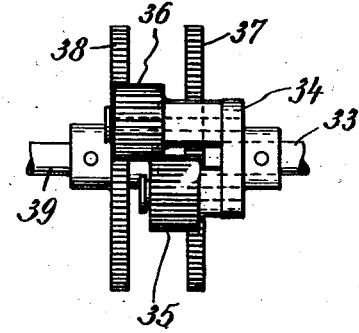
Fig. 6 is an end view of the mechanism shown in Fig. 5.

The position of the artificial horizon line 30 of the pitch indicator with respect to the indicator case 28 is controlled by the gyroscopes 1 and 2 through the transmission mechanisms D and B described above, the follow-up mechanisms 9 and 10 and a planetary gear integrating mechanism interposed between the follow-up mechanisms 9 and 10 and the disk or support 29 of the pitch indicator. The output shaft 33 (see Figs. 1, 5 and 6) of the follow-up mechanism 10 associated with the master gyro 2 carries an arm 34 which supports two pinions 35 and 36 meshing with gears 37 and 38 respectively. The gear 38 is fixed with respect to the output shaft 39 of the follow-up mechanism 9 associated with the pilot gyro 1. The gear 37 is the output element of the integrating mechanism and transmits its motion to the indicator disk 29 through a gear 40 and a shaft 41 on which the disk 29 carrying the artificial horizon line 30 is mounted. The spur gears 35 and 36 mesh with each other and the gear 36 meshes with the gear 38 and the gear 35 meshes with the gear 37 as explained above.

Figure 3:
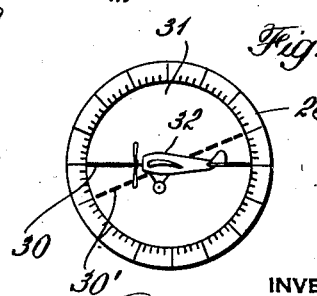
Fig. 3 is an enlarged view of the pitch indicator of Fig. 1.

The planetary gear mechanism described above cooperates with pilot gyro 1 and master gyro 2 through their respective follow-up mechanisms 9 and 10, the arrangement being such that the inclination of the artificial horizon line 30 with respect to the reference mark (the side view image 32 of an airplane as observed on the face of the pitch indicator) affords a true indication of the inclination of the longitudinal axis of the airplane with respect to the horizontal, and, in general, this indication is reliable regardless of whether the rotor axes of the two gyroscopes occupy their normal vertical positions or occupy positions inclined to their normal vertical positions. Thus if it be assumed that the gyro rotor axes remain vertical while the longitudinal axis of the airplane is inclined to the horizontal, as during a climb, the gyro rotor axes remain parallel and both gyroscopes are inclined at the same angle to the horizontal axis of the airplane. This condition is shown by the pitch indicator for, as the longitudinal axis of the airplane departs from the horizontal the output gears 37 and 40 of the planetary gear mechanism rotate through a corresponding angle to cause a relative displacement of the horizon line of the indicator with respect to the reference mark so that these appear as indicated in Fig. 3, with the reference mark occupying the position shown at 30', at an angle with respect to the longitudinal axis of the miniature airplane image 32.

If precession of the gyro rotor axes away from their vertical positions occurs at any time this does not introduce an error in the indicator or control mechanism of any substantial magnitude because the precession errors of the two gyroscopes are neutralized through the action of the planetary gear integrating mechanism. This is true in the illustrative embodiment shown in the accompanying drawings in which the pilot gyro 1 is substantially twice as sensitive in its response to precession forces as the master gyro 2 and accordingly extraneous forces experienced during air turbulence or during turns or at any other time, cause a precession of the pilot gyro through an angle substantially twice as great as the angle of precession of the master gyro. These unequal displacements of the gyro axes from their normal vertical positions produce corresponding unequal angular displacement or rotation of the output shafts 39 and 33 of the follow-up mechanisms 9 and 10 respectively, the ratio being substantially 2 to 1. The effect of this is to tend to cause the output or control gear 37 of the planetary mechanism to remain stationary and, accordingly, the horizon line 30 does not change its position with respect to the reference mark 32, due to any precession of the gyro axes away from the vertical. The arm 34 carried by the output shaft 33 of the follow-up mechanism 10 tends to cause rotation of the control gear 37 through a certain angle, but the displacement of the output shaft 39 of the follow-up mechanism 9 through an angle substantially twice as great as the angular displacement of the arm 34 tends to cause the control gear 37 to rotate the same angular distance in the opposite direction, the net result being that the control gear 37 remains stationary as stated above. The integrating mechanism performs an integrating function in that it may be said to solve the following equation:

$$(K+\theta_1) - \left[ \frac{(K+\theta_2) - (K+\theta_1)}{\frac{M-1}{1}} \right]$$

in which $(K+\theta_1)$ is the rotation of shaft 33 with respect to the support 6; $(K+\theta_2)$ is the rotation of shaft 39 with respect to the support 6; K is the actual rotation of the support 6 with respect to the horizontal; $\theta_1$ and $\theta_2$ are the errors or angular displacements respectively of the master gyro and pilot gyro; M is the ratio of sensitivities, i. e., the ratio of the error of the pilot gyro to that of the master gyro; and $$\frac{M-1}{1}$$

is the gear ratio between gears 37 and 38. The pitch indicator disk 29 indicates the value of K—the errors of the two gyros are thus neutralized and the horizon line 30 remains horizontal.

Figure 2:
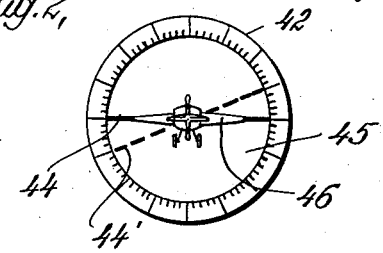
Fig. 2 is an enlarged detail view of the bank indicator forming a part of the system shown in Fig. 1.

The bank indicator shown in Fig. 2 and at 27 in Fig. 1 may be of substantially the same construction as the pitch indicator illustrated in Fig. 3 and at 26 in Fig. 1. Thus the bank indicator may include a case 42 having a scale or graduations thereon and enclosing a rotatably mounted disk or support 43 carrying an artificial horizon line or mark 44, and a transparent cover 45 on the case 42 carries a reference mark 46 which may be in the form of an image of a miniature airplane, illustrating a rear view of the airplane. This reference mark 46 indicates the transverse axis of the support 6 and of the airplane. As long as the transverse axis of the airplane remains horizontal the reference mark 46 is in alignment with the artificial horizon line 44, but whenever the transverse axis of the airplane is inclined to the horizontal these two marks are inclined to each other. Thus during a right turn with proper banking the attitude of the airplane with respect to the horizontal is indicated by the bank indicator, the reference marks being inclined to each other as indicated by the dotted line 44' in Fig. 2.

The operation of the bank indicator 27 is controlled through the follow-up mechanisms 11 and 12 associated with the pilot gyro 1 and the master gyro 2 respectively as explained above. A planetary gear integrating mechanism is interposed between the follow-up mechanisms 11 and 12 and the disk or support 43 rotatably mounted in the bank indicator case 42. Thus the output shaft 47 of the follow-up mechanism 12 carries an arm 48 which supports two spur gears 49 and 50 meshing with each other. The gear 49 also meshes with a gear 51 which may be regarded as a control gear and I have shown this gear as driving a gear 52 through an idler gear 53, and the gear 52 is connected to the indicator disk 43 by a shaft 54. The spur gear 50 meshes with a gear 55 mounted on the output shaft 56 of the follow-up mechanism 11. The arrangement of this planetary gear system is such that the bank or inclination of the transverse axis of the airplane with respect to the horizontal is transmitted to the bank indicator and the precession errors of the gyros away from their normal vertical positions are neutralized by the planetary gear mechanism in the same manner as such errors are neutralized by the integrating mechanism associated with the pitch indicator 26.

In the illustrative embodiment of my invention explained above, two gyroscopes of unequal sensitivity are utilized for the purpose of providing a reliable artifical horizon for bank and pitch control, but it is to be understood that my invention is not limited to any such specific embodiment but includes such variations as fall within the scope of the appended claims. Those skilled in the art will apprecate that any suitable transmission and follow-up mechanism may be employed and that any mechanism performing the function of the illustrated planetary gear mechanisms may be used without departing from the spirit of my invention. The gear ratios and other details may be modified as desired and alterations and auxiliary devices may be used for eliminating or reducing gimbal ring, friction errors and other errors in accordance with accepted practice.

I claim:

1. A gyroscope system comprising a support, two horizon gyroscope of unequal sensitivity, bearing means for mounting said gyroscopes on said support for movement with respect thereto, and means for transmitting and integrating the movements of said gyroscopes with respect to said support, including means for neutralizing the effect of precession movements of said gyroscopes.

2. A gyroscope system comprising a support, two horizon gyroscopes of unequal sensitivity, bearing means for mounting said gyroscopes on said support for movement with respect thereto, means for transmitting and integrating the movements of said gyroscopes with respect to said support, including means for neutralizing the effect of precession movements of said gyroscopes, and means controlled by said transmitting and integrating means for indicating the inclination of at least one axis of said support with respect to the horizontal.

3. A gyroscope system comprising a support, two horizon gyroscopes of unequal sensitivity, bearing means for mounting said gyroscopes on said support for movement with respect thereto, means for transmitting and integrating the movements of said gyroscopes with respect to said support, including means for neutralizing the effect of precession movements of said gyroscopes, and means controlled by said transmitting and integrating means for indicating the inclination of the longitudinal and transverse axes of said support with respect to the horizontal.

4. A gyroscope system comprising a support, two horizon gyroscopes one of which is substantially twice as sensitive as the other gyroscope, bearing means for mounting said gyroscopes on said support for movement with respect thereto, and means for transmitting and integrating the movements of said gyroscopes with respect to said support, including means for neutralizing the effect of precession movements of said gyroscopes.

5. A gyroscope system comprising a support, two horizon gyroscopes of unequal sensitivity, bearing means for mounting said gyroscopes on said support for movement with respect thereto and with the gyroscope rotor axes normally parallel to each other, and means for transmitting and integrating the movements of said gyroscopes with respect to said support, including means for neutralizing the effect of precession movements of said gyroscopes.

ARNOLD M. FEDDE.